(12) United States Patent
Li et al.

(10) Patent No.: US 11,125,337 B1
(45) Date of Patent: Sep. 21, 2021

(54) HOUSING FOR MAGNETIC FLUID SEALING DEVICE AND AGITATION KETTLE/REACTION KETTLE

(71) Applicant: Tsinghua University, Beijing (CN)

(72) Inventors: Decai Li, Beijing (CN); Qian Li, Beijing (CN); Zhi Gao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/111,066

(22) Filed: Dec. 3, 2020

(30) Foreign Application Priority Data

Sep. 10, 2020 (CN) .......................... 202010948324.3

(51) Int. Cl.
*F16J 15/43* (2006.01)
(52) U.S. Cl.
CPC ...................... *F16J 15/43* (2013.01)
(58) Field of Classification Search
CPC ......................................................... F16J 15/43
See application file for complete search history.

(56) References Cited

U.S. PATENT DOCUMENTS

| | | | | |
|---|---|---|---|---|
| 2,247,505 A | * | 7/1941 | Kohler | F16J 15/3412 277/400 |
| 2,828,983 A | * | 4/1958 | Hunt | F16J 15/3488 277/370 |
| RE31,645 E | * | 8/1984 | Regan | E21B 33/038 166/332.5 |
| 5,076,882 A | * | 12/1991 | Oyanagi | F16D 23/025 156/500 |

FOREIGN PATENT DOCUMENTS

| | | |
|---|---|---|
| CN | 202884037 | 4/2013 |
| CN | 108679232 A * | 10/2018 |
| CN | 208778699 | 4/2019 |

OTHER PUBLICATIONS

SIPO, First Office Action for CN Application No. 202010948324.3, dated Feb. 9, 2021.
SIPO, Second Office Action for CN Application No. 202010948324.3, dated Mar. 31, 2021.
SIPO, Notice of Registration for CN Application No. 202010948324.3, dated Apr. 20, 2021.

* cited by examiner

*Primary Examiner* — Vishal A Patel
(74) *Attorney, Agent, or Firm* — Hodgson Russ LLP

(57) ABSTRACT

A housing for a magnetic fluid sealing device and an agitation kettle/reaction kettle are disclosed. The housing includes: a first end cover, a casing and an elastic member. The first end cover is spaced apart from a first portion of the casing in radially inward and outward directions of the casing. At least one of the casing, a positioning platform and the first end cover is provided with a mounting groove, and the elastic member is arranged in the mounting groove. A first sealing ring is provided between the casing and the first end cover.

18 Claims, 2 Drawing Sheets

HOUSING FOR MAGNETIC FLUID SEALING DEVICE AND AGITATION KETTLE/REACTION KETTLE

CROSS-REFERENCE TO RELATED APPLICATIONS

This application is based upon and claims priority to Chinese Patent Application No. 202010948324.3, filed on Sep. 10, 2020, the entire contents of which is incorporated herein by reference for all purposes.

FIELD

The present disclosure relates to the field of sealing technology in mechanical engineering, and particularly to a housing for a magnetic fluid sealing device and an agitation kettle/reaction kettle.

BACKGROUND

Magnetic fluid seals are widely used, especially in rotating vacuum seals with low linear velocity, due to advantages of zero leakage, low friction and long life. In actual use, shaft runout in a radial direction may occur in some working conditions, which affects the service life and reliability of the magnetic fluid seal. Such potential problems exist due to the limited installation accuracy and processing accuracy, for example when the shaft rotates at a high speed or when the shaft has a large diameter.

In the related art, the magnetic fluid seal is equipped with rolling bearings or sliding bearings. In the case of a large shaft diameter, for a magnetic fluid seal adopting a rolling bearing, there will be a large radial play between the rolling bearing and the shaft, such that the shaft is more prone to radial runout, and it is difficult to ensure a sealing gap between a pole shoe of the magnetic fluid seal and the shaft, which will cause pole teeth in the pole shoe to be easily worn and fatigued by the rotating shaft, thereby seriously reducing the reliability and service life of the magnetic fluid seal; for a magnetic fluid seal adopting a sliding bearing, due to inherent characteristics of the sliding bearings, it is difficult to ensure a sealing gap, and consequently, the shaft runout increases, resulting in seal failure.

To solve the problems in the related art, Application CN201821058118.X titled "Magnetic Fluid Sealing Device Aided by Bellow" proposes the use of bellows for auxiliary sealing. However, in actual use, first, the bellows located on the outermost side of the seal are susceptible to damage and scratch, which leads to failure of the bellows and consequently the seal failure; second, the bellows are usually suitable for vacuum sealing and hence have a limited application range, which further restricts the use of the magnetic fluid seal; third, the sealing aided by bellows only allows a small range of radial runout of the shaft, otherwise the bellows are susceptible to shear failure; fourth, due to the thin-walled characteristic, the bellows are prone to fatigue and hence have a short service life.

SUMMARY

The present disclosure aims to solve at least one of the problems existing in the related art.

To this end, embodiments of one aspect of the present disclosure propose a housing for a magnetic fluid sealing device. The housing for the magnetic fluid sealing device can ensure a sealing gap between a pole shoe of the magnetic fluid seal and a shaft, and thus ensure the reliability of the magnetic fluid seal.

Embodiments of the other aspect of the present disclosure propose an agitation kettle/reaction kettle.

The housing includes: a first end cover; a casing having a first positioning portion, wherein the first positioning portion comprises a positioning platform extending in a radial direction of the casing and a first portion arranged on a first end surface of the positioning platform; the positioning platform of the casing is arranged on the first end cover; the first end cover is arranged opposite to and spaced apart from the first portion of the casing in radially inward and outward directions of the casing, and the casing can move in the radially inward and outward directions relative to the first end cover, wherein at least one of the positioning platform and the first end cover is provided with a mounting groove; and an elastic member arranged in the mounting groove, wherein the elastic member is in a compressed state, and a part of the elastic member extends out of the mounting groove and cooperates with at least one of the positioning platform and the first end cover.

For the housing according to the embodiments of the present disclosure, by providing the elastic member, and spacing the first end cover from the casing, it can ensure the reliability of the magnetic fluid sealing in the casing even when the radial runout occurs to the shaft, and the service life of the magnetic fluid sealing device can be prolonged.

In some embodiments, a spacing distance between the first end cover and the first portion of the casing in the radially inward and outward directions of the casing is 0.101 mm to 1.999 mm or 2.001 mm to 20 mm.

In some embodiments, the first portion is a positioning sleeve extending along an axial direction of the casing, and the first end cover is sleeved outside the first portion of the casing, or the first portion of the casing is sleeved outside the first end cover.

In some embodiments, the first portion is a positioning block or a positioning sleeve extending in an axial direction of the casing, an end surface of the first end cover opposite to the positioning platform is provided with a positioning groove along a peripheral direction of the casing, the first portion extends into the positioning groove, and a gap exists between the first portion and a lateral surface of the positioning groove.

In some embodiments, an end surface of the first end cover opposite to the casing is provided with a mounting groove, and the part of the elastic member cooperates with the casing.

In some embodiments, a plurality of mounting grooves are evenly distributed along a peripheral direction of the casing, a plurality of elastic members are arranged in the plurality of mounting grooves in one-to-one correspondence, and a shape of the elastic member matches an inner surface of the mounting groove; optionally, the elastic member is a spring or a compression spring.

In some embodiments, the mounting groove is an annular groove, a peripheral direction of the mounting groove is consistent with a peripheral direction of the casing, and the elastic member is annular; optionally, the elastic member is a coil spring.

In some embodiments, a first sealing ring is provided between the positioning platform and the first end cover; optionally, the first end surface of the first end cover is provided with a second end cover, the second end cover has a second positioning portion and a clamping portion, and the second positioning portion is located inside the clamping portion; the second end cover is mounted on the casing by bolts or screws, and the second end cover and the casing cooperate to clamp the first end cover onto the casing; a diameter of an inner ring of the second positioning portion is smaller than a diameter of an inner ring of the casing, and thus the second positioning portion can position devices within the casing; optionally, a second sealing ring is provided between the first end cover and the second end cover.

In some embodiments, the casing comprises an outer casing and an inner casing, a cooling cavity is defined between the outer casing and the inner casing, a first liquid inlet and a first liquid outlet are provided in a lateral surface of the outer casing, the first liquid inlet is connected with a liquid inlet pipe, and the first liquid outlet is connected with a liquid outlet pipe; optionally, the liquid inlet pipe is threaded with the first liquid inlet, and the liquid outlet pipe is threaded with the first liquid outlet.

An agitation kettle/reactor kettle according to embodiments of a second aspect of the present disclosure includes a magnetic fluid sealing device. The magnetic fluid sealing device includes: a housing configured as the housing for the above magnetic fluid sealing devices; a first rolling bearing and a second rolling bearing arranged within a casing of the housing along a first direction; a shaft supported on the first rolling bearing and the second rolling bearing, wherein optionally the shaft is a smooth shaft or a stepped shaft; and at least one sealing unit. Each sealing unit includes: two pole shoes arranged within the casing and fitted over the shaft, wherein the two pole shoes are spaced apart along an axial direction of the shaft, an inner peripheral surface of each pole shoe is provided with pole teeth, and magnetic fluid is injected between the pole teeth and the shaft; a permanent magnet arranged within the casing and fitted over the shaft, wherein the permanent magnet is arranged between the two pole shoes; and a third sealing ring arranged between an outer lateral surface of the pole shoe and the inner casing.

For the agitation kettle/reactor kettle according to the embodiments of the present disclosure, by means of the elastic member, the first sealing ring and the second sealing ring, the service life of the first sealing ring can be effectively ensured, and the sealing gap of the magnetic fluid sealing device can be also ensured, thereby guaranteeing the sealing performance of the magnetic fluid sealing device.

In some embodiments, the magnetic fluid sealing device further comprises a plurality of magnetic isolation rings arranged within the casing and fitted over the shaft, wherein the plurality of magnetic isolation rings are arranged at intervals along the axial direction of the shaft, and each sealing unit is located between two adjacent magnetic isolation rings, or a plurality of sealing units are arranged between two adjacent magnetic isolation rings; and a kettle body, wherein the first end cover is arranged on the kettle body, and a fourth sealing ring is provided between the first end cover and the kettle body.

In some embodiments, each pole shoe is provided with a cooling liquid channel extending in a radial direction of the shaft; a lateral surface of the inner casing is provided with a plurality of second liquid inlets and a plurality of second liquid outlets, each of the second liquid inlets is in communication with the cooling liquid channel and the cooling cavity, each of the second liquid outlets is in communication with the cooling liquid channel and the cooling cavity, and the second liquid inlets and the second liquid outlets are oppositely arranged in the inner housing; the cooling liquid channels of the plurality of pole shoes, the plurality of second liquid inlets, and the plurality of second liquid outlets are in one-to-one correspondence.

The agitation kettle/reactor kettle has the same advantages over the related art as the above housing, which will not be elaborated again.

Figure 1:
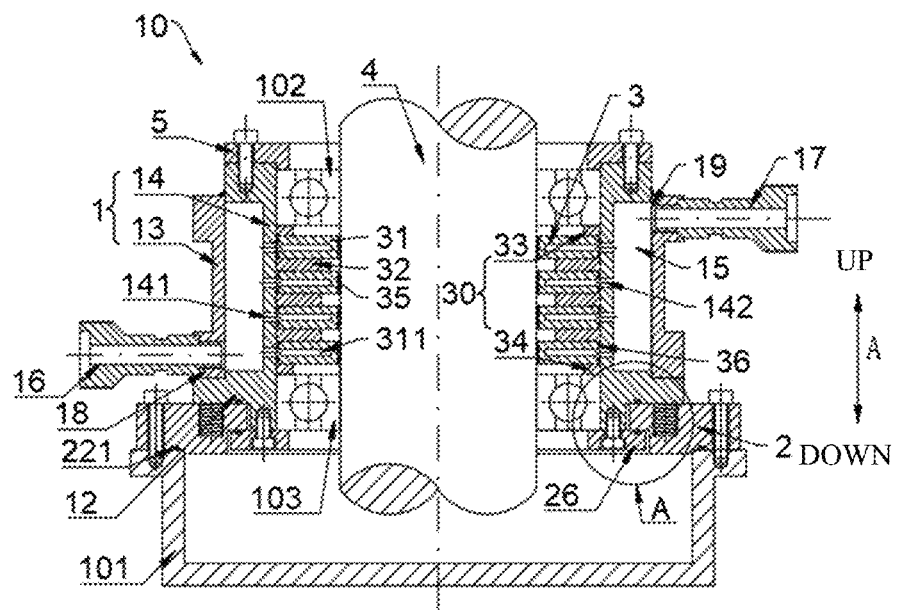
FIG. 1 is a schematic view of an agitation kettle/reaction kettle according to an embodiment of the present disclosure.

REFERENCE NUMERALS agitation kettle/reaction kettle 10, kettle body 101, first rolling bearing 102, second rolling bearing 103, casing 1, first positioning portion 11, positioning platform 12, second sealing ring 121, first portion 122, outer casing 13, inner casing 14, second liquid inlet 141, second liquid outlet 142, cooling cavity 15, liquid inlet pipe 16, liquid outlet pipe 17, first liquid inlet 18, first liquid outlet 19, first end cover 2, fourth sealing ring 221, mounting groove 23, elastic member 24, first sealing ring 25, second end cover 26, second positioning portion 261, clamping portion 262, magnetic fluid sealing device 3, magnetic isolation ring 30, pole shoe 31, cooling liquid channel 311, permanent magnet 32, first magnetic isolation ring 33, second magnetic isolation ring 34, magnetic fluid 35, third sealing ring 36, shaft 4, third end cover 5.

DETAILED DESCRIPTION

Embodiments of the present application will be described in detail below, and the examples of the embodiments will be illustrated in the drawings. The embodiments described herein with reference to the drawings are illustrative, and merely used to explain the present application. The embodiments shall not be construed to limit the present application.

Figure 2:
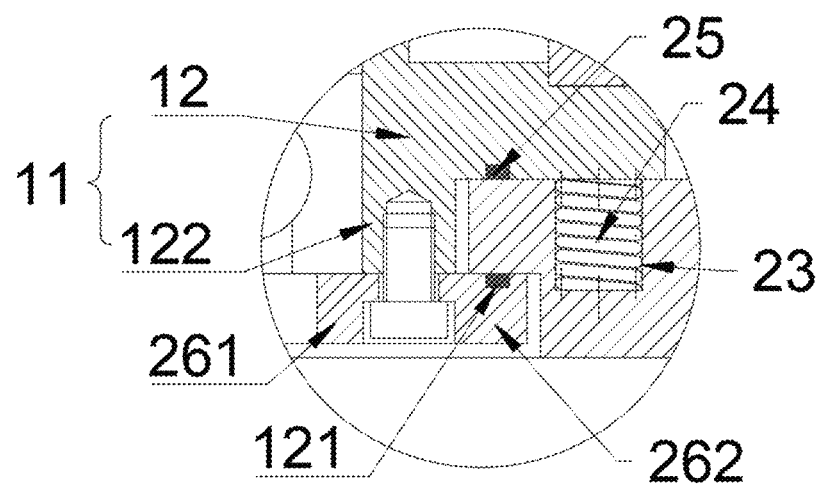
FIG. 2 is a partially enlarged view of part A in FIG. 1.
Figure 3:
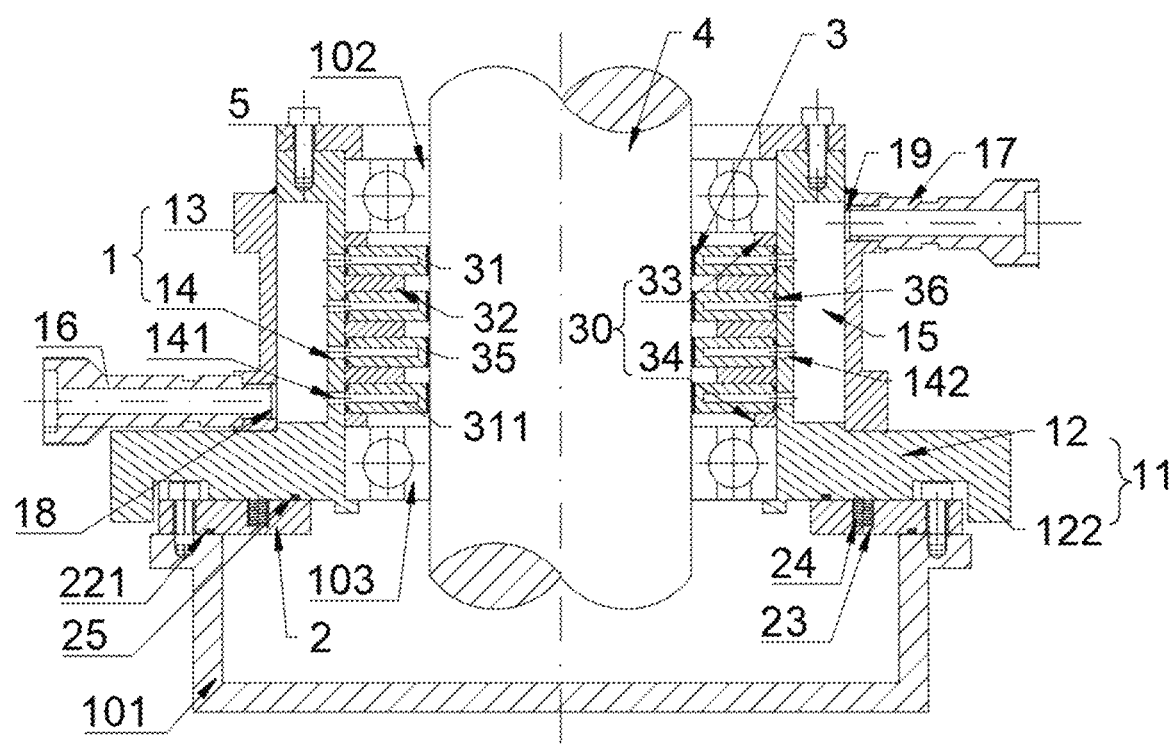
FIG. 3 is another schematic view of an agitation kettle/reaction kettle according to an embodiment of the present disclosure.

As shown in FIG. 1 to FIG. 3, a housing for a magnetic fluid sealing device according to embodiments of the present disclosure includes a first end cover 2, a casing 1, and an elastic member 24.

The casing 1 has a first positioning portion 11. The first positioning portion 11 includes a positioning platform 12 extending in a radial direction of the casing 1 and a first portion 122 arranged on a first end surface of the positioning platform 12 (for example, on a lower end surface of the positioning platform 12). The positioning platform 12 of the casing 1 is disposed on the first end cover 2. The first end cover 2 is arranged opposite to and spaced apart from the first portion 122 of the casing 1 in radially inward and outward directions of the casing 1, so that the casing 1 can move in the radially inward and outward directions relative to the first end cover 2. At least one of the positioning platform 12 and the first end cover 2 is provided with a mounting groove 23.

The elastic member 24 is arranged in the mounting groove 23, and the elastic member 24 is in a compressed state, in which a part of the elastic member 24 extends out of the mounting groove 23, and a part of the elastic member 24 cooperates with at least one of the positioning platform 12 and the first end cover 2.

As for the housing for the magnetic fluid sealing device according to the embodiments of the present disclosure, the first end cover 2 is spaced apart from the first portion 122 of the casing 1 in the inward and outward directions, that is, there is a gap between an inner side of the first end cover 2 and an outer side of the casing 1, so that the casing 1 can move in the gap. When the magnetic fluid sealing device 3 is in use, if radial runout occurs to a shaft 4, the shaft 4 will drive the casing 1 to jump radially in the gap, so that the deformation pressure on the casing 1 and thus the pressure on a bearing mounted in the casing 1 can be reduced, so as to prevent damage to the bearing, which would otherwise destroy a sealing gap between the magnetic fluid sealing device 3 and the shaft 4, and to prevent the magnetic fluid sealing device 3 in the casing 1 from being damaged.

A spacing distance between the first end cover 2 and the first portion 122 of the casing 1 in the radially inward and outward directions of the casing 1 is 0.101 mm to 1.999 mm or 2.001 mm to 20 mm.

When the spacing distance is 0.101 mm to 1.999 mm, within this range, the magnetic fluid sealing device 3 can be applied to various kinds of reaction kettles. Because the reaction kettle operates at a relatively low speed, the radial runout of the rotating shaft in the reaction kettle has a small amplitude and frequency. The spacing distance in the range of 0.101 mm-1.999 mm cannot only meet the needs of the radial runout occurring in the reaction kettle, but also ensure the sealing performance of the magnetic fluid sealing device 3.

When the spacing distance is 2.001 mm to 20 mm, within this range, the magnetic fluid sealing device 3 can be applied to various high-speed centrifuges and other equipment. Due to a high operation speed of the centrifuge, the radial runout of the rotating shaft in the reaction kettle has a relatively great amplitude and frequency. The spacing distance in the range of 2.001 mm 20 mm can prevent devices within the magnetic fluid sealing device 3 from being damaged, so as to ensure the sealing gap of the magnetic fluid sealing device 3.

As for the housing for the magnetic fluid sealing device according to the embodiments of the present disclosure, by providing the elastic member 24, the elastic member 24 can support the casing 1 so as to adjust the pressure between the casing 1 and the first end cover 2. Therefore, the elastic member 24 can reduce the pressure on the sealing ring between the casing 1 and the first end cover 2 and hence diminish the wear of the sealing ring, thereby prolonging the service life of the sealing ring and ensuring the sealing performance of the magnetic fluid sealing device 3. Moreover, it is possible to reduce a friction area between opposite end surfaces of the casing 1 and the first end cover 2 when the radial runout occurs to the shaft 4, so as to lower the noise and reduce the degree of damage to the casing 1 and the first end cover 2. When the radial runout occurs, the elastic member 24 can also provide resilience to keep the gap of the entire magnetic fluid sealing device 3 substantially stable.

In addition, as for the housing for the magnetic fluid sealing device according to the embodiments of the present disclosure, since the elastic member 24 is arranged in the mounting groove 23, the elastic member 24 can be prevented from being exposed to the external environment and hence from being damaged, which can protect the elastic member 24 effectively, prolong the service life of the elastic member 24, and ensure the sealing performance of the magnetic fluid sealing device 3.

The housing for the magnetic fluid sealing device will be further described below. To make the technical solutions of the present application easier to understand, the technical solutions will be described below by example of an axial extension direction of the casing 1 (that is, the axial direction of the casing 1 is consistent with an up-down direction). Among them, the up-down direction is indicated by arrow A in FIG. 1.

As shown in FIGS. 1-3, a first sealing ring 25 is provided between the positioning platform 12 and the first end cover 2. The first sealing ring 25 plays a role in sealing. The first sealing ring 25 can prevent leakage of a sealed medium. The elastic member 24 can adjust the pressure acting on the first sealing ring 25, reduce the wear of the first sealing ring 25 and prolong the service life of the first sealing ring 25, so as to further guarantee the sealing performance of the magnetic fluid sealing device 3. Moreover, due to the cooperation of the first sealing ring 25 and the elastic member 24, compared with the sealing way by the bellows, the present disclosure is not limited to vacuum sealing, that is, can also be applied in non-vacuum sealing, especially in sealing situations where the pressure of the sealed medium is positive. Thus, the application range of the magnetic fluid sealing device 3 is greatly expanded.

Optionally, a first end surface of the first end cover 2 (for example, a lower end surface of the first end cover 2) is provided with a second end cover 26. The second end cover 26 has a second positioning portion 261 and a clamping portion 262, and the second positioning portion 261 is located inside the clamping portion 262. The second end cover 26 is mounted on the casing 1 by bolts or screws, so that the second end cover 26 and the casing 1 cooperate to clamp the first end cover 2 onto the casing 1. A diameter of an inner ring of the second positioning portion 261 is smaller than a diameter of an inner ring of the casing 1, so that the second positioning portion 261 can position devices within the casing 1.

Optionally, a second sealing ring 121 is provided between the first end cover 2 and the second end cover 26 to further prevent the leakage of the sealed medium. Moreover, the second sealing ring 121 can reduce a contact area between the first end cover 2 and the second end cover 26, and further reduce noise. The second end cover 26 is mounted to the casing 1 by screws or bolts, which can not only facilitate the installation or removal of the second end cover 26 to or from the casing 1, but also adjust the pressure on the second sealing ring 121 to prevent the second sealing ring 121 from being damaged, thereby prolong the service life of the second sealing ring 121.

As shown in FIGS. 1-3, the first portion 122 is a positioning sleeve extending along the axial direction of the casing 1. The first end cover 2 is sleeved outside the first portion 122 of the casing 1, or the first portion 122 of the casing 1 is sleeved outside the first end cover 2. Specifically, a diameter of an inner lateral surface of the first end cover 2 is larger than a diameter of an outer lateral surface of the positioning sleeve, so that the first end cover 2 can be fitted over the positioning sleeve, and there is a gap between the outer lateral surface of the positioning sleeve and the inner lateral surface of the first end cover 2 (as shown in FIG. 1). In such a way, the casing 1 can move in the radially inward and outward directions relative to the first end cover 2, and the removal and installation of the first end cover 2 can be facilitated, so that the structure of the housing for the magnetic fluid sealing device is more reasonable. Alternatively, a diameter of an inner lateral surface of the positioning sleeve is larger than a diameter of an outer lateral surface of the first end cover 2, so that the positioning sleeve is fitted over the first end cover 2, and there is a gap between the inner lateral surface of the positioning sleeve and the outer lateral surface of the first end cover 2 (as shown in FIG. 3). In such a way, the casing 1 can move in the radially inward and outward directions relative to the first end cover 2.

The first portion 122 is a positioning block or a positioning sleeve extending in the axial direction of the casing 1, and an end surface of the first end cover 2 opposite to the positioning platform 12 is provided with a positioning groove along a peripheral direction of the casing 1. The first portion 122 extends into the positioning groove, and a gap exists between the first portion 122 and a lateral surface of the positioning groove. Specifically, there are gaps between the first portion 122 and both lateral surfaces of the positioning groove, and the positioning groove enables the casing 1 to move in the radially inward and outward directions relative to the first end cover 2.

An end surface of the first end cover 2 opposite to the casing 1 is provided with a mounting groove 23, and a part of the elastic member 24 cooperates with the casing 1. In other words, the elastic member 24 is arranged in the mounting groove 23 of the first end cover 2, and a part of the elastic member 24 protrudes out of the mounting groove 23 to cooperate with the casing 1, so that the elastic member 24 can support the casing 1, and the casing 1 is not in contact with the first end cover 2. The elastic member 24 can reduce the pressure of the casing 1 acting on the first sealing ring 25—the pressure on the first sealing ring 25 can be adjusted by changing the number and rigidity of the elastic members 24, which improves the service life of the first sealing ring 25, and effectively solve the problem of damage to the seal due to the runout of the shaft 4. The gap between contact end surfaces of the casing 1 and the first end cover 2, as well as the gap between contact end surfaces of the first end cover 2 and the second end cover 26, created by the elastic member 24, the first sealing ring 25, and the second sealing ring 121, can reduce friction between the end surfaces and reduce the noise. Additionally, the elasticity of the elastic member 24 can buffer the radial runout of the casing 1, and the elastic member 24 can provide resilience when the radial runout occurs to the shaft, so as to keep the gap of the entire magnetic fluid sealing device 3 substantially stable.

There are a plurality of mounting grooves 23 evenly distributed along the peripheral direction of the casing 1, and there are a plurality of elastic members 24. The plurality of elastic members 24 are arranged in the mounting grooves 23 in one-to-one correspondence. The shape of the elastic member 24 matches an inner surface of the mounting groove 23 to prevent the elastic member 24 from shaking in the mounting groove 23. Optionally, the elastic member 24 is a spring or a compression spring. The plurality of elastic members 24 can provide stronger support to the casing 1, thereby making the housing for the magnetic fluid sealing device more stable. The pressure on the first sealing ring 25 can be adjusted by changing the number and rigidity of the elastic members 24, which improves the service life of the first sealing ring 25 and enhance the buffering effect of the elastic members 24, so as to ensure the sealing performance of the magnetic fluid sealing device 3. Optionally, the mounting groove 23 is a circular hole, so that the mounting groove 23 matches the shape of the elastic member 24.

The mounting groove 23 is an annular groove, a peripheral direction of the mounting groove 23 is consistent with the peripheral direction of the casing 1, and the elastic member 24 is annular. Optionally, the elastic member 24 is a coil spring. Therefore, the installation difficulty of the elastic member 24 can be reduced, and the stability of the housing for the magnetic fluid sealing device can be enhanced.

The casing 1 includes an outer casing 1 and an inner casing 14. A cooling cavity 15 is defined between the outer casing 1 and the inner casing 14. A first liquid inlet 18 and a first liquid outlet 19 are provided in a lateral surface of the outer casing 1. The first liquid inlet 18 is connected with a liquid inlet pipe 16, and the first liquid outlet 19 is connected with a liquid outlet pipe 17. Therefore, the liquid inlet pipe 16 is in communication with the cooling cavity 15, and the liquid outlet pipe 17 is in communication with the cooling cavity 15. Further, the liquid inlet pipe 16 is threaded with the first liquid inlet 18, and the liquid outlet pipe 17 is threaded with the first liquid outlet 19. When the temperature of the magnetic fluid rises due to the high-speed rotation of the shaft 4, a cooling liquid can enter the cooling cavity 15 through the liquid inlet pipe 16. After the cooling liquid in the cooling cavity 15 exchanges heat with the magnetic fluid sealing device 3, the cooling liquid flows out of the cooling cavity 15 through the liquid outlet pipe 17. The cooling liquid effectively cools the magnetic fluid sealing device 3, which can prevent failure of a magnetic fluid 35 in the sealing gap due to high temperatures, and also prevent the performance of a permanent magnet 32 from degrading or even failing in a high temperature environment, so as to ensure that the magnetic fluid sealing device 3 can sustainably function well, and prolong the service life of the magnetic fluid sealing device 3. In addition, since the liquid inlet pipe 16 is threaded with the first liquid inlet 18, and the liquid outlet pipe 17 is threaded with the first liquid outlet 19, the replacement and disassembly of the liquid inlet pipe 16 and the liquid outlet pipe 17 can be facilitated.

An agitation kettle/reaction kettle 10 according to embodiments of the present disclosure will be described below with reference to FIG. 1 and FIG. 3.

As shown in FIGS. 1 and 3, the agitation kettle/reaction kettle 10 according to the embodiments of the present disclosure includes a magnetic fluid sealing device 3. The magnetic fluid sealing device 3 includes a housing, a first rolling bearing 102, a second rolling bearing 103, a shaft 4, and at least one sealing unit. The housing is the housing for the magnetic fluid sealing device according to the above embodiments of the present disclosure. The first rolling bearing 102 and the second rolling bearing 103 are arranged within a casing 1 of the housing along a first direction. The shaft 4 is supported on the first rolling bearing 102 and the second rolling bearing 103.

Each sealing unit includes: two pole shoes 31, a permanent magnet 32, and a third sealing ring 36. The pole shoes are arranged within the casing 1 and fitted over the shaft 4. The two pole shoes 31 are spaced apart along an axial direction of the shaft 4. An inner peripheral surface of each pole shoe 31 is provided with pole teeth, and magnetic fluid 35 is injected between the pole teeth and the shaft 4. The permanent magnet 32 is arranged within the casing 1 and fitted over the shaft 4. The permanent magnet 32 is arranged between the two pole shoes 31. The third sealing ring 36 is arranged between an outer lateral surface of the pole shoe 31 and the inner casing 14. The permanent magnet 32 generates magnetic lines of force, passing through the pole shoes 31, the magnetic fluid 35, the shaft 4, then passing through the magnetic fluid 35, the pole shoes 31, and returning to the permanent magnet 32. A non-uniform strong magnetic field is generated in sealing gaps between the pole shoes 31 and the shaft 4, so that the magnetic fluid 35 seals and produces pressure resistance, thereby playing a role of sealing.

The first direction refers to an axial direction of the casing 1 of the housing for the magnetic fluid sealing device, as indicated by arrow A in FIG. 1. Optionally, the shaft 4 is a smooth shaft or a stepped shaft. The smooth shaft 4 has high strength and can be used in special occasions where grooving and processing steps on the shaft 4 are not allowed. In addition, when the shaft 4 has a large diameter, the difficulty of grooving and processing steps is relatively high, and it is difficult to ensure the processing accuracy, thus the smooth shaft 4 may reduce the processing and manufacturing accuracy of the magnetic fluid sealing device 3. The shaft 4 may also be a stepped shaft in order to withstand axial load.

As shown in FIG. 1, for the agitation kettle/reaction kettle 10 according to the embodiments of the present disclosure, by mounting the pole shoes 31, the permanent magnet 32, and the shaft 4 in the housing for the magnetic fluid sealing device, and spacing the first end cover 2 of the housing apart from the first portion of the casing 1 of the housing in the radially inward and outward directions, the shaft 4 will drive the casing 1 to jump radially at the same time, thereby reducing the impact on the first rolling bearing 102 and the second rolling bearing 103, and preventing the failure of the first rolling bearing 102 and the second rolling bearing 103 due to the radial runout of the shaft 4, so as to ensure the sealing gap of the magnetic fluid sealing device 3. Meanwhile, since the elastic member 24 can provide resilience when the radial runout occurs to the shaft 4, the casing 1 can quickly return to the original position. Besides, the first sealing ring 25 and the second sealing ring 121 can ensure the sealing performance of the magnetic fluid sealing device 3 and prevent the sealed medium in the agitation kettle/reaction kettle 10 from leaking.

It can be understood that according to actual needs, the first rolling bearing 102 and the second rolling bearing 103, as well as at least two pole shoes 31 can be mounted in such a way that the at least two pole shoes 31 are arranged between the first rolling bearing 102 and the second rolling bearing 103, or the first rolling bearing 102 and the second rolling bearing 103 are mounted on the same end of the at least two pole shoes 31 (for example, upper end surfaces of the at least two pole shoes 31), so as to ensure the sealing gap of the magnetic fluid sealing device 3. An inner ring of the first rolling bearing 102 and an inner ring of the second rolling bearing 103 are in interference fit with the shaft. An outer ring of the first rolling bearing 102 and an outer ring of the second rolling bearing 103 can be in small clearance fit, transition fit or interference fit with an inner lateral surface of the casing 1, to ensure the sealing gap between an inner lateral surface of the pole shoe 31 and the shaft 4.

Both the pole shoe 31 and the shaft 4 can be made of magnetically conductive materials, such as electrical pure iron. The permanent magnet 32 may be an NdFeB permanent magnet. The magnetic fluid 35 can be selected according to specific working conditions, such as ester-based magnetic fluids, engine oil-based magnetic fluids, perfluoropolyether oil-based magnetic fluids, and so on. Regarding the magnetically conductive material and the material of the permanent magnet 32, those skilled in the art can make choice according to actual conditions, and in this connection, the present disclosure will not provide specific limitation.

The magnetic fluid sealing device 3 also includes a kettle body 101 and a plurality of magnetic isolation rings 30. The first end cover 2 of the housing for the magnetic fluid sealing device is arranged on the kettle body 101 by screws or bolts, and a fourth sealing ring 221 is provided between the first end cover 2 and the kettle body 101. Specifically, screws or bolts are arranged on an outer lateral surface of the fourth sealing ring 221, to ensure the sealing effect of the fourth sealing ring 221.

The plurality of magnetic isolation rings 30 are arranged within the casing 1 and fitted over the shaft 4. The plurality of magnetic isolation rings 30 are arranged at intervals along the axial direction of the shaft 4. Each sealing unit is located between two adjacent magnetic isolation rings 30, or a plurality of sealing units are arranged between two adjacent magnetic isolation rings 30. The magnetic isolation rings 30 can prevent the magnetic lines of force emitted by the permanent magnet 32 from leaking from two ends of the pole shoe 31, and further improve the sealing effect of the magnetic fluid sealing device 3.

In other words, the magnetic isolation rings 30 and the sealing units may be arranged alternately, such as an arrangement order of one magnetic isolation ring 30, one sealing unit, another magnetic isolation ring 30, another sealing unit, and still another magnetic isolation ring 30. The magnetic isolation rings 30 can also be arranged at both ends of the plurality of sealing units. The arrangement of the magnetic isolation rings 30 and the sealing units can be selected according to actual needs.

Each pole shoe 31 is provided with a cooling liquid channel 311 extending in a radial direction of the shaft 4. A lateral surface of the inner casing 14 is provided with a plurality of second liquid inlets 141 and a plurality of second liquid outlets 142. Each of the second liquid inlets 141 is in communication with the cooling liquid channel 311 and the cooling cavity 15. Each of the second liquid outlets 142 is in communication with the cooling liquid channel 311 and the cooling cavity 15. The second liquid inlets 141 and the second liquid outlets 142 are oppositely arranged in the inner casing 14. A first end of the second liquid outlet 142 is in communication with the cooling liquid channel 311, and a second end of the second liquid outlet 142 is in communication with the cooling cavity 15. The second liquid inlets 141 and the second liquid outlets 142 are oppositely arranged in the inner casing 14, and the cooling liquid channels 311 of the plurality of pole shoes 31, the plurality of second liquid inlets 141 and the plurality of second liquid outlets 142 are in one-to-one correspondence. The outer lateral surface of each pole shoe 31 is provided with two third sealing rings 36, and the two third sealing rings 36 are located on upper and lower sides of the cooling liquid channel 311, respectively. This design can effectively increase a contact area between the pole shoe and the cooling liquid, thereby improving the cooling efficiency, and will not affect the formation of a magnetic circuit, thereby ensuring the pressure resistance of the sealing device. The two third sealing rings 36 are arranged on the upper and lower sides of the cooling liquid channel 311 respectively to prevent the sealed medium from leaking from an outer peripheral surface of the pole shoe.

The agitation kettle/reaction kettle 10 according to some specific exemplary embodiments of the present disclosure will be described below with reference to FIGS. 1 and 2.

As shown in FIG. 1, the agitation kettle/reaction kettle 10 includes a kettle body 101 and a magnetic fluid sealing device 3.

A fourth sealing ring 221 is provided between a first end cover 2 of the housing for the magnetic fluid sealing device and the kettle body 101, and the first end cover 2 and the kettle body 101 are fixed by screws or bolts.

The magnetic fluid sealing device 3 includes a housing for the magnetic fluid sealing device. The housing for the magnetic fluid sealing device includes the first end cover 2, a casing 1, and an elastic member 24. The casing 1 includes a positioning platform 12 and a positioning sleeve. A diameter of an inner lateral surface of the first end cover 2 is larger than a diameter of an outer lateral surface of the positioning sleeve, so that the first end cover 2 can be fitted over the positioning sleeve, and there is a gap between the outer lateral surface of the positioning sleeve and the inner lateral surface of the first end cover 2. In such a way, the casing 1 can move in the radially inward and outward directions relative to the first end cover 2. A lower end surface of the first end cover 2 is provided with a second end cover 26, and the second end cover 26 is mounted to the casing 1 by bolts or screws, so that the first end cover 2 is mounted between the casing 1 and the second end cover 26. A first sealing ring 25 is provided between an upper side of the first end cover 2 and the casing 1, and a second sealing ring 121 is provided between an upper side of the second end cover 26 and a lower side of the first end cover 2. The upper side of the first end cover 2 is provided with a plurality of mounting grooves 23 evenly distributed in the peripheral direction, and each mounting groove 23 is provided with one elastic member 24 therein. An end of the elastic member 24 extends out of the mounting groove 23, and the casing 1 is directly pressed on the elastic member 24, so that the elastic member 24 supports the casing 1. In such a way, the pressure of the casing 1 on the first sealing ring 25 can be reduced, thereby diminishing the wear of the first sealing ring 25 and prolonging the service life of the first sealing ring 25; moreover, the elasticity of the elastic member 24 can buffer the radial runout of the casing 1, and the elastic member 24 can provide resilience when the radial runout occurs. In a case of a plurality of elastic members 24, the number and rigidity of the elastic members 24 can be adjusted to further control the effect, so as to keep the gap of the entire magnetic fluid sealing device 3 substantially stable.

The magnetic fluid sealing device 3 also includes a first magnetic isolation ring 33, a second magnetic isolation ring 34, a first rolling bearing 102, a second rolling bearing 103, a first pole shoe, a second pole shoe, a third pole shoe, a fourth pole shoe, a first permanent magnet, a second permanent magnet, a third permanent magnet, and a shaft 4, all of which are mounted within the housing for the magnetic fluid sealing device. The first magnetic isolation ring 33, the second magnetic isolation ring 34, the first rolling bearing 102, the second rolling bearing 103, the first pole shoe, the second pole shoe, the third pole shoe, the fourth pole shoe, the first permanent magnet, the second permanent magnet, and the third permanent magnet are all fitted over the shaft 4. The first permanent magnet is arranged between the first pole shoe and the second pole shoe. The second permanent magnet is arranged between the second pole shoe and the third pole shoe. The third permanent magnet is arranged between the third pole shoe and the fourth pole shoe. An inner ring of the first pole shoe, an inner ring of the second pole shoe, an inner ring of the third pole shoe, and an inner ring of the fourth pole shoe are all provided with pole teeth. Magnetic fluid 35 is injected between the pole teeth and the shaft 4. The first magnetic isolation ring 33 is arranged at an upper end of the first pole shoe, and the second magnetic isolation ring 34 is arranged at a lower end of the fourth pole shoe.

The first rolling bearing 102 is fixed at an upper end of the first magnetic isolation ring 33. An inner ring of the first rolling bearing 102 is in interference fit with the shaft 4, and an outer ring of the first rolling bearing 102 is in small clearance fit, transition fit or interference fit with an inner ring of the casing 1. The second rolling bearing 103 is fixed at a lower end of the second magnetic isolation ring 34. An inner ring of the second rolling bearing 103 is in interference fit with the shaft 4, and an outer ring of the second rolling bearing 103 is in small clearance fit, transition fit or interference fit with the inner ring of the casing 1. A part of the second end cover 26 and the second magnetic isolation ring 34 position the outer ring of the second rolling bearing 103. An upper end of the casing 1 is mounted with a third end cover 5 by screws or bolts. The third end cover 5 and the first magnetic isolation ring 33 position the outer ring of the first rolling bearing 102.

The casing 1 includes an outer casing 1 and an inner casing 14. A cooling cavity 15 is defined between the outer casing 1 and the inner casing 14. A first liquid inlet 18 and a first liquid outlet 19 are provided in a lateral surface of the outer casing 1. The first liquid inlet 18 is connected with a liquid inlet pipe 16, and the first liquid outlet 19 is connected with a liquid outlet pipe 17. Each pole shoe 31 is provided with a cooling liquid channel 311 along a radial direction of the shaft 4. A lateral surface of the inner casing 14 is provided with second liquid inlets 141 and second liquid outlets 142 that are in one-to-one correspondence with the cooling liquid channel 311. The second liquid inlets 141 are individually in communication with the cooling liquid channel 311 and the cooling cavity 15. The second liquid outlets 142 are individually in communication with the cooling liquid channel 311 and the cooling cavity 15. The second liquid inlets 141 and the second liquid outlets 142 are oppositely arranged in the inner casing 14. An outer lateral surface of each pole shoe 31 is provided with two third sealing rings 36, and the two third sealing rings 36 are located on upper and lower sides of the cooling liquid channel 311, respectively. This design can effectively increase a contact area between the pole shoe and the cooling liquid, thereby improving the cooling efficiency.

Therefore, the housing for the magnetic fluid sealing device according to the embodiments of the present disclosure can effectively solve the problem that the sealing member of the magnetic fluid sealing device 3 is damaged due to the radial runout of the shaft 4 under high-speed working conditions or with a large shaft diameter, and hence can ensure the service life of the magnetic fluid sealing device 3.

In the description of the present application, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," "circumferential" and the like should be construed to refer to the orientation as then described or as shown in the drawings under discussion. These relative terms are for convenience and simplification of description and do not indicate or imply that the device or element referred to must have a particular orientation, or be constructed and operated in a particular orientation, so these terms shall not be construed to limit the present application.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present specification, reference throughout this specification to "an embodiment," "some embodiments," "an example," "a specific example," "some examples" or the like means that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

Although embodiments of the present disclosure have been shown and illustrated, it shall be understood by those skilled in the art that the above embodiments are exemplary and cannot be construed to limit the present disclosure; various changes, modifications, alternatives, and variants can be made in the embodiments without departing from the scope of the present disclosure.

The invention claimed is:

1. A housing for a magnetic fluid sealing device, comprising:
    a first end cover;
    a casing having a first positioning portion, wherein the first positioning portion comprises a positioning platform extending in a radial direction of the casing and a first portion arranged on a first end surface of the positioning platform; the positioning platform of the casing is arranged on the first end cover; the first end cover is arranged opposite to and spaced apart from the first portion of the casing in radially inward and outward directions of the casing, and the casing can move in the radially inward and outward directions relative to the first end cover, wherein at least one of the positioning platform and the first end cover is provided with a mounting groove, wherein a first sealing ring is provided between the positioning platform and the first end cover, the first end surface of the first end cover is provided with a second end cover, the second end cover has a second positioning portion and a clamping portion, and the second positioning portion is located inside the clamping portion; the second end cover is mounted on the casing by bolts or screws, and the second end cover and the casing cooperate to clamp the first end cover onto the casing; a diameter of an inner ring of the second positioning portion is smaller than a diameter of an inner ring of the casing, and the second positioning portion can position devices within the casing; and
    an elastic member configured as a spring and arranged in the mounting groove, wherein the elastic member is in a compressed state, and a part of the elastic member extends out of the mounting groove and cooperates with at least one of the positioning platform and the first end cover.

2. The housing according to claim 1, wherein a spacing distance between the first end cover and the first portion of the casing in the radially inward and outward directions of the casing is 0.101 mm to 1.999 mm or 2.001 mm to 20 mm.

3. The housing according to claim 1, wherein the first portion is a positioning sleeve extending along an axial direction of the casing, and the first end cover is sleeved outside the first portion of the casing, or the first portion of the casing is sleeved outside the first end cover.

4. The housing according to claim 1, wherein the first portion is a positioning block or a positioning sleeve extending in an axial direction of the casing, an end surface of the first end cover opposite to the positioning platform is provided with a positioning groove along a peripheral direction of the casing, the first portion extends into the positioning groove, and a gap exists between the first portion and a lateral surface of the positioning groove.

5. The housing according to claim 1, wherein an end surface of the first end cover opposite to the casing is provided with a mounting groove, and the part of the elastic member cooperates with the casing.

6. The housing according to claim 1, wherein a plurality of mounting grooves are evenly distributed along a peripheral direction of the casing, a plurality of elastic members are arranged in the plurality of mounting grooves in one-to-one correspondence, and a shape of the elastic member matches an inner surface of the mounting groove.

7. The housing according to claim 1, wherein the mounting groove is an annular groove, a peripheral direction of the mounting groove is consistent with a peripheral direction of the casing, and the elastic member is annular.

8. The housing according to claim 7, wherein the elastic member is a coil spring.

9. The housing according to claim 1, wherein a second sealing ring is provided between the first end cover and the second end cover.

10. The housing according to claim 1, wherein the casing comprises an outer casing and an inner casing, a cooling cavity is defined between the outer casing and the inner casing, a first liquid inlet and a first liquid outlet are provided in a lateral surface of the outer casing, the first liquid inlet is connected with a liquid inlet pipe, and the first liquid outlet is connected with a liquid outlet pipe.

11. The housing according to claim 10, wherein the liquid inlet pipe is threaded with the first liquid inlet, and the liquid outlet pipe is threaded with the first liquid outlet.

12. An agitation kettle/reactor kettle, comprising a magnetic fluid sealing device, wherein the magnetic fluid sealing device comprises:
    a housing, wherein the housing comprises:
        a first end cover;
        a casing having a first positioning portion, wherein the first positioning portion comprises a positioning platform extending in a radial direction of the casing and a first portion arranged on a first end surface of the positioning platform; the positioning platform of the casing is arranged on the first end cover; the first end cover is arranged opposite to and spaced apart from the first portion of the casing in radially inward and outward directions of the casing, and the casing can move in the radially inward and outward directions relative to the first end cover, wherein at least one of the positioning platform and the first end cover is provided with a mounting groove; and an elastic member arranged in the mounting groove, wherein the elastic member is in a compressed state, and a part of the elastic member extends out of the mounting groove and cooperates with at least one of the positioning platform and the first end cover;

a first rolling bearing and a second rolling bearing arranged within a casing of the housing along a first direction;

a shaft supported on the first rolling bearing and the second rolling bearing; and at least one sealing unit, each comprising:

two pole shoes arranged within the casing and fitted over the shaft, wherein the two pole shoes are spaced apart along an axial direction of the shaft, an inner peripheral surface of each pole shoe is provided with pole teeth, and a magnetic fluid is injected between the pole teeth and the shaft;

a permanent magnet arranged within the casing and fitted over the shaft, wherein the permanent magnet is arranged between the two pole shoes; and a third sealing ring arranged between an outer lateral surface of the pole shoe and the casing.

13. The agitation kettle/reactor kettle according to claim 12, wherein the magnetic fluid sealing device further comprises a plurality of magnetic isolation rings arranged within the casing and fitted over the shaft, wherein the plurality of magnetic isolation rings are arranged at intervals along the axial direction of the shaft, and each sealing unit is located between two adjacent magnetic isolation rings, or a plurality of sealing units are arranged between two adjacent magnetic isolation rings; and a kettle body, wherein the first end cover is arranged on the kettle body, and a fourth sealing ring is provided between the first end cover and the kettle body.

14. The agitation kettle/reactor kettle according to claim 12, wherein the housing comprises an outer casing and an inner casing, a cooling cavity is defined between the outer casing and the inner casing, a first liquid inlet and a first liquid outlet are provided in a lateral surface of the outer casing, the first liquid inlet is connected with a liquid inlet pipe, and the first liquid outlet is connected with a liquid outlet pipe;

each pole shoe is provided with a cooling liquid channel extending in a radial direction of the shaft;

a lateral surface of the inner casing is provided with a plurality of second liquid inlets and a plurality of second liquid outlets, each of the second liquid inlets is in communication with the cooling liquid channel and the cooling cavity, each of the second liquid outlets is in communication with the cooling liquid channel and the cooling cavity, and the second liquid inlets and the second liquid outlets are oppositely arranged in the inner housing;

the cooling liquid channels of the plurality of pole shoes, the plurality of second liquid inlets, and the plurality of second liquid outlets are in one-to-one correspondence.

15. The agitation kettle/reactor kettle according to claim 14, wherein the liquid inlet pipe is threaded with the first liquid inlet, and the liquid outlet pipe is threaded with the first liquid outlet.

16. The agitation kettle/reactor kettle according to claim 12, wherein the first portion is a positioning sleeve extending along an axial direction of the casing, and the first end cover is sleeved outside the first portion of the casing, or the first portion of the casing is sleeved outside the first end cover.

17. The housing according to claim 12, wherein the first portion is a positioning block or a positioning sleeve extending in an axial direction of the casing, an end surface of the first end cover opposite to the positioning platform is provided with a positioning groove along a peripheral direction of the casing, the first portion extends into the positioning groove, and a gap exists between the first portion and a lateral surface of the positioning groove.

18. The agitation kettle/reactor kettle according to claim 12, wherein the shaft is a smooth shaft or a stepped shaft.

* * * * *